No. 803,917. PATENTED NOV. 7, 1905.
C. LUYERS.
BRAKE APPARATUS FOR RAILWAY VEHICLES.
APPLICATION FILED JUNE 29, 1905.

2 SHEETS—SHEET 1.

Witnesses
J. Hm. Kuhne
John G. Percival

Inventor
Charles Luyers
By Richards
Attorneys

No. 803,917. PATENTED NOV. 7, 1905.
C. LUYERS.
BRAKE APPARATUS FOR RAILWAY VEHICLES.
APPLICATION FILED JUNE 29, 1905.

2 SHEETS—SHEET 2.

Witnesses
Inventor
Charles Luyers

UNITED STATES PATENT OFFICE.

CHARLES LUYERS, OF VILVORDE, BELGIUM, ASSIGNOR TO COMPAGNIE INTERNATIONALE DE FREINAGE (SYSTEME LUYERS) SOCIETE ANONYME, OF BRUSSELS, BELGIUM.

BRAKE APPARATUS FOR RAILWAY-VEHICLES.

No. 803,917. Specification of Letters Patent. Patented Nov. 7, 1905.

Application filed June 29, 1905. Serial No. 267,592.

*To all whom it may concern:*

Be it known that I, CHARLES LUYERS, a subject of the King of the Belgians, residing at Vilvorde, Belgium, have invented new and useful Improvements in Brake Apparatus for Railway-Vehicles, of which the following is a specification.

This invention has reference to brake apparatus for railway-vehicles; and it has for its object to provide an improved construction of brake apparatus of the kind which comprises a friction-pulley keyed on the axle of the vehicle and brake shoes or blocks carried by an armature hung from a beam which takes its bearing upon the said axle.

The improved construction has for its chief purposes to reduce the heating of the pulleys by insuring a rapid dissipation of the heat generated by the friction of the brake-blocks, to maintain at its maximum the retarding effect exerted by the blocks during the entire duration of their action by causing the blocks to act upon a friction-surface of suitable width, and to render the entire brake apparatus easily accessible and capable of being readily taken to pieces, while being also strong and light.

The accompanying drawings illustrate, by way of example, the improved apparatus applied to one of the axles of a railway-truck.

Figure 1:
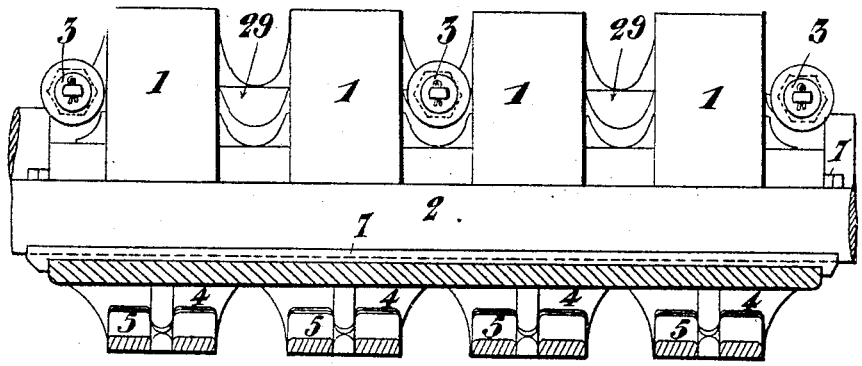
Figure 2:
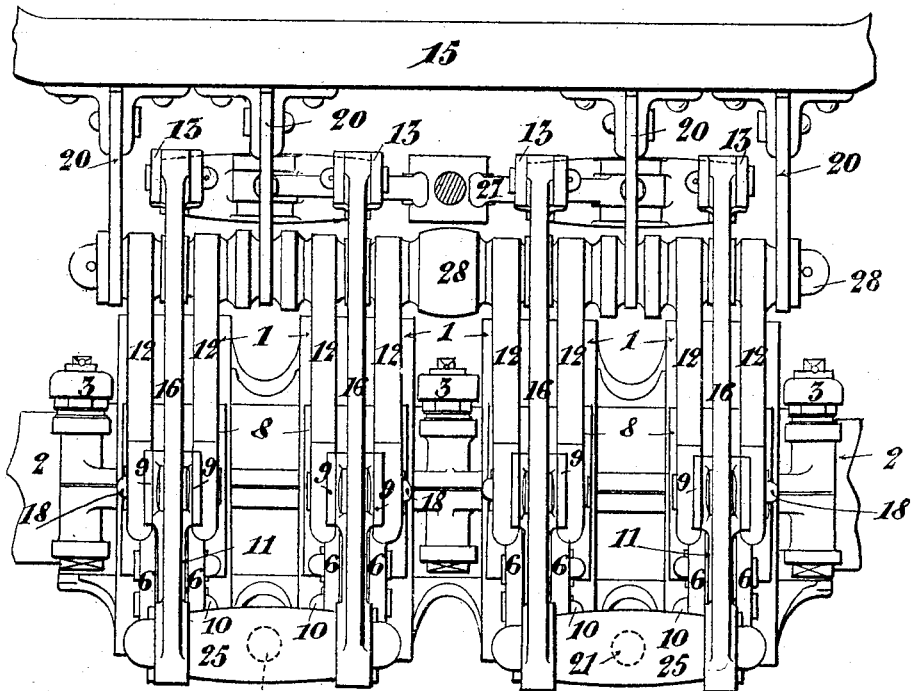
Figure 3:
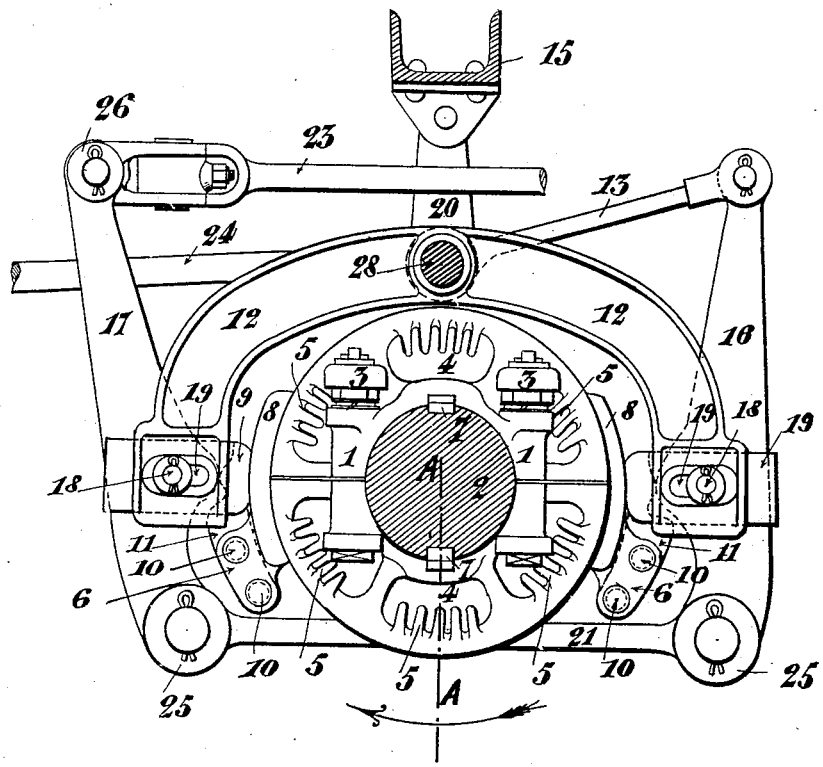
Figure 4:
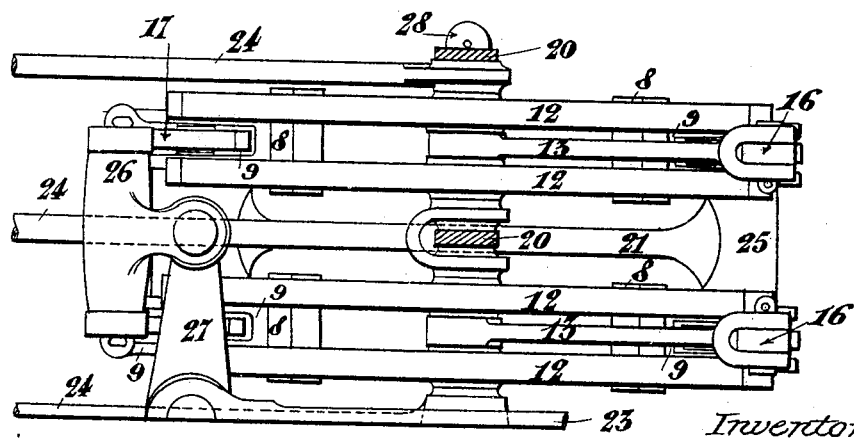

Figure 1 is a separate view of the pulley which is shown in plan in the top half of the figure and in vertical longitudinal section taken on the line A A of Fig. 3 in the bottom half of the figure. Fig. 2 is an elevation of the general arrangement of the brake apparatus. Fig. 3 is a side elevation thereof, and Fig. 4 is a plan view of one-half of the apparatus.

The pulley 1, preferably made of cast-steel, is constructed in two semicylindrical halves put together and keyed and fixed on the axle 2 of the vehicle by means of bolts 3 3 and keys 7. Its bearing-face is divided up into four portions, connected together by ribs 29, and each of which is adapted to be acted upon by a pair of brake blocks or shoes 8. Its diameter is approximately one-third of that of the tread of the tires of the wheels of the vehicle. The operative portions of the pulley are perforated at 4 4 for the purpose of insuring a circulation of air, and they are formed with gills or ribs 5 5, projecting in the perforations 4 for the purpose of increasing the cooling-surface.

The brake blocks or shoes 8, of soft cast-iron, are made with two lugs 6 at their lower parts, which serve to attach the blocks to an extension 11 of the block-holders 9 by means of bolts and nuts 10, which prevent any oscillation of the blocks. To remove these blocks, it is merely necessary after the bolts 10 have been withdrawn to slide the blocks downward along the face of the pulley. The block-holders 9 are of U shape, and their two side portions embrace the brake-block-operating levers 16 17 and are arranged between the ends of two stirrup-shaped pieces 12, hung, by means of links 20, to a beam 15, which takes its bearing upon the tops of the axle-boxes at the two ends of the axle 2.

The block-holders are attached to the levers 16 17 and to the stirrups 12 by means of pins 18, which extend through the levers 16 17, the two side portions of the block-holders, and the slots 19, formed in the stirrups 12. These slots allow of the horizontal sliding movement of the block-holders for the purpose of putting on and taking off the brake-blocks.

The levers 17, which are situated on the outside of the axle, are connected, by means of a rod 23, to the brake-operating mechanism arranged between the two axles of the vehicle and by means of connecting-rods 21 to the levers 16, that are arranged at the inside of the axle, and connected at their upper ends to the inclined connecting-rods 13, which connect them to a long pin 28, to which are connected the stirrups 12, the links 20, and bars 24, that are attached to the end cross-beam of the vehicle for the purpose of maintaining the brake-block gear in place.

In the construction shown in the drawings the levers 16 and 17 are connected in pairs to the connecting-rods 21 by means of coupling-pieces 25, and the levers 17 are connected together in pairs at their upper ends by means of coupling-pieces 26, which in turn are connected to a rocking beam 27, to which the operating-rod 23 is connected.

When the operating-rod 23 is pulled into the position shown in Fig. 3, the tractive force exerted on the upper end of the lever 17 produces a double rocking movement of this lever, which rocks on the pin 25, (with the result of moving the sliding pivot 18 and its corresponding brake-block nearer to the pulley,) and at the same time rocks also on the pin 18, thereby exerting a pull upon the connecting-rod 21 and upon the lower arm of the lever 16, which in turn rocks at one and the same time on the other pivot 18 and on the upper end of the inclined link 13, which has the result of causing this link 13 to rock slightly on the long pin 28 and to move the said other pivot 18 and its corresponding brake-block nearer to the pulley.

The movement of the rod 23 in the contrary direction produces a general rocking movement of the entire system in the contrary sense and therefore the moving of the brake-blocks away from the pulley.

Having now described my invention, what I claim as new, and desire to secure by Letters Patent, is—

1. In brake apparatus for railway-vehicles, comprising a friction-pulley fixed on the axle of the vehicle, and brake-blocks adapted to act upon the pulley, in combination, said friction-pulley divided up into a number of recessed or perforated operative elements, ribs connecting said elements together, brake-blocks one pair of which is adapted to act upon each element of the said pulley and means for operating said brake-blocks.

2. In brake apparatus for railway-vehicles, comprising a friction-pulley fixed on the axle of the vehicle, and brake-blocks adapted to act upon the pulley, in combination, said friction-pulley divided up into a number of recessed or perforated operative elements, ribs connecting said elements together, ribs or gills projecting in the perforations of said elements brake-blocks one pair of which is adapted to act in conjunction with each element of the said pulley, and means for operating said brake-blocks.

3. In brake apparatus for railway-vehicles, comprising a friction-pulley fixed on the axle of the vehicle, and brake-blocks adapted to act upon the pulley, in combination, said friction-pulley divided up into a number of recessed or perforated operative elements, brake-blocks one pair of which is adapted to act upon each element of the said pulley, said brake-blocks being formed with two lugs constituting an extension of the lower parts thereof, brake-block holders having extensions for engaging between the lugs of the brake-blocks, means for fixing the said lugs to the said extensions of the brake-block holders, and means for operating the said brake-blocks and brake-block holders.

4. In brake apparatus for railway-vehicles, comprising a friction-pulley fixed on the axle of the vehicle, and brake-blocks adapted to act upon said pulley, in combination, said friction-pulley divided up into a number of recessed or perforated operative elements, brake-blocks one pair of which is adapted to act upon each element of the said pulley, brake-block holders, levers for actuating each pair of brake-block holders and brake-blocks, means for connecting together and operating the levers of each pair of holders and blocks, a pin carrying the said operating means and an inclined link connecting one actuating-lever of each pair of levers with the said pin.

In testimony whereof I have affixed my signature in presence of two subscribing witnesses.

CHARLES LUYERS

Witnesses:
W. W. TIERRATIM,
L FIÉRARD.